Sept. 9, 1958   S. A. HADDAD   2,851,654
AMPEROMETRIC DIFFERENTIAL MEASUREMENT SYSTEM
Filed Sept. 25, 1956   4 Sheets-Sheet 1
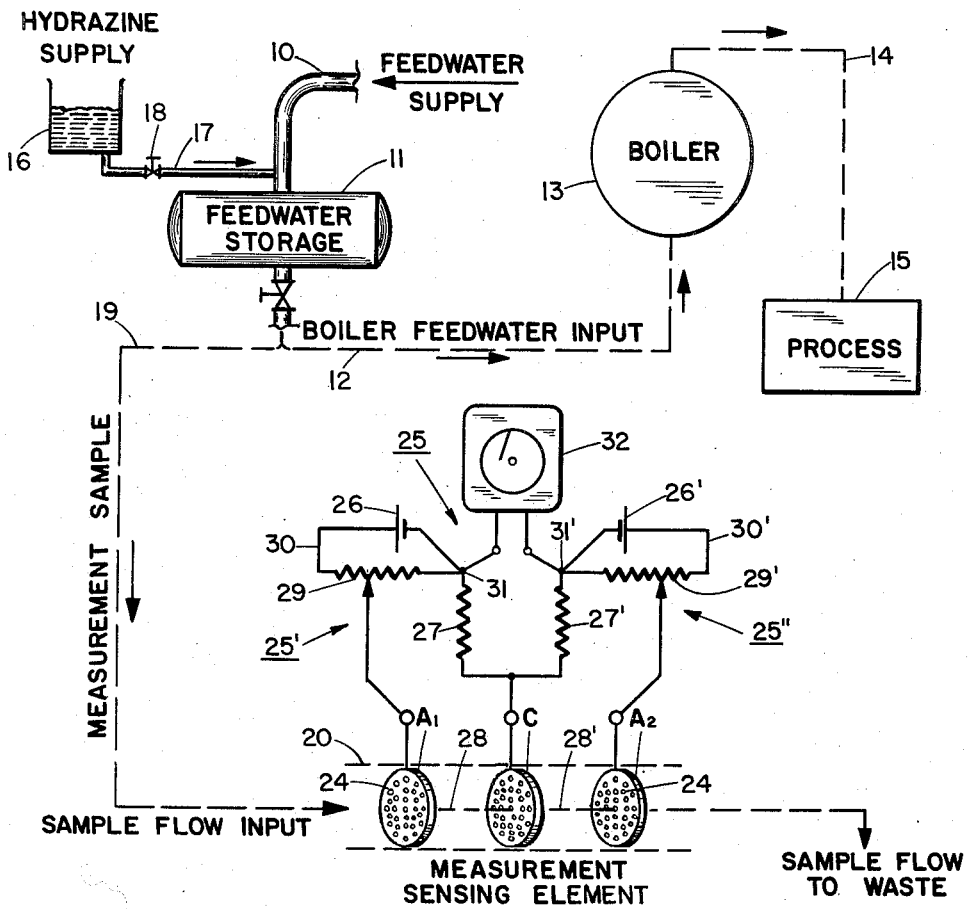
FIG. I
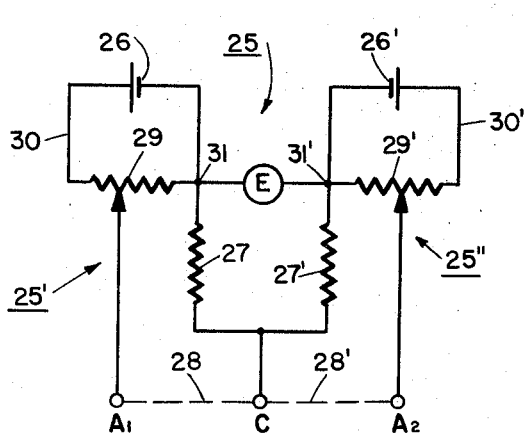
FIG. II
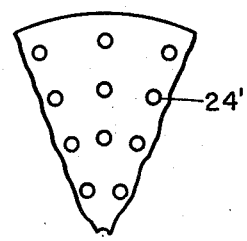
FIG. Ia
INVENTOR.
SAMIR A. HADDAD
BY
Lawrence H. Poeton
AGENT

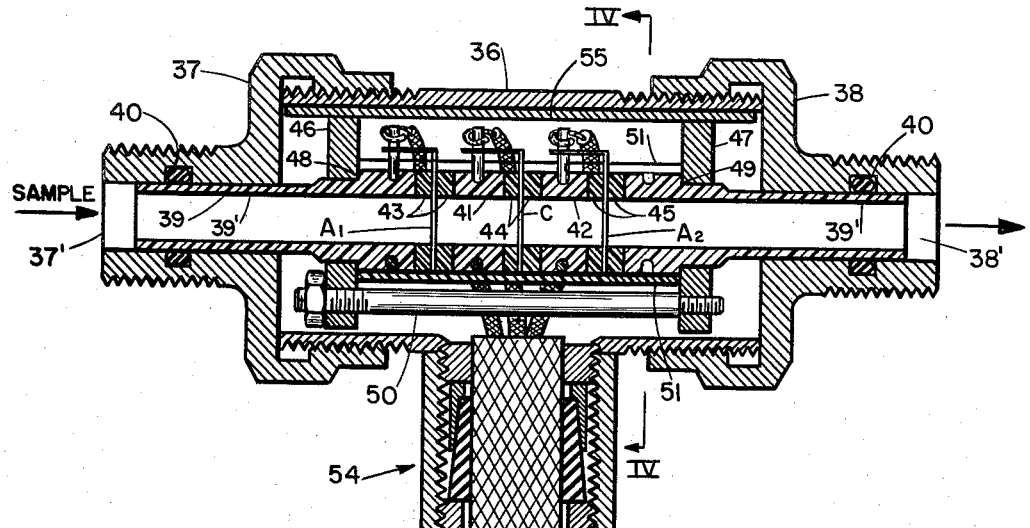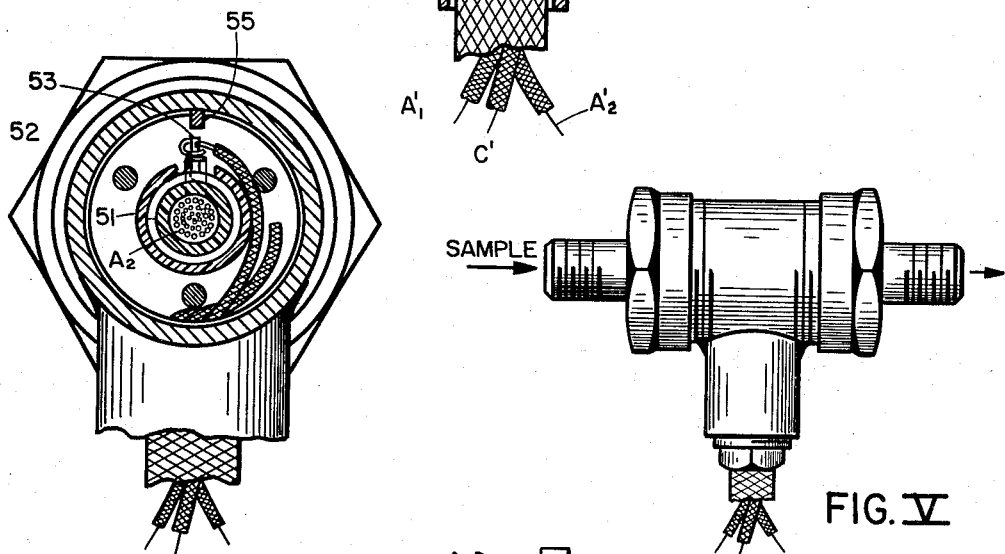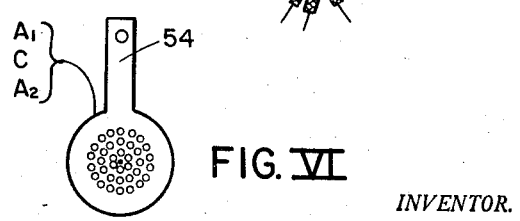

Sept. 9, 1958 S. A. HADDAD 2,851,654
AMPEROMETRIC DIFFERENTIAL MEASUREMENT SYSTEM
Filed Sept. 25, 1956 4 Sheets-Sheet 3
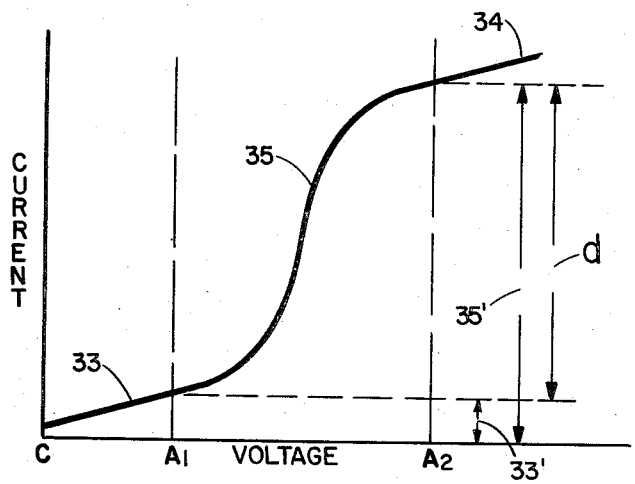
FIG. VII
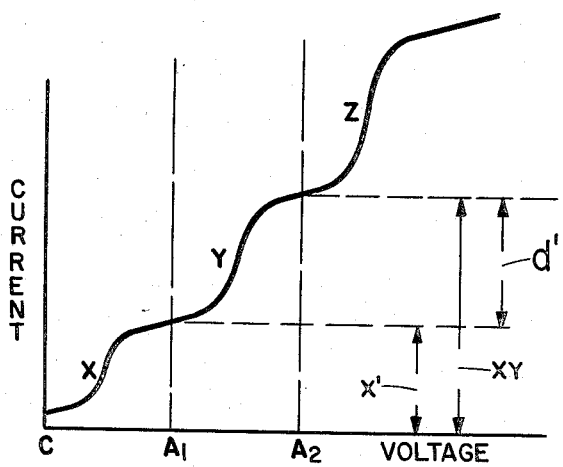
FIG. VIII
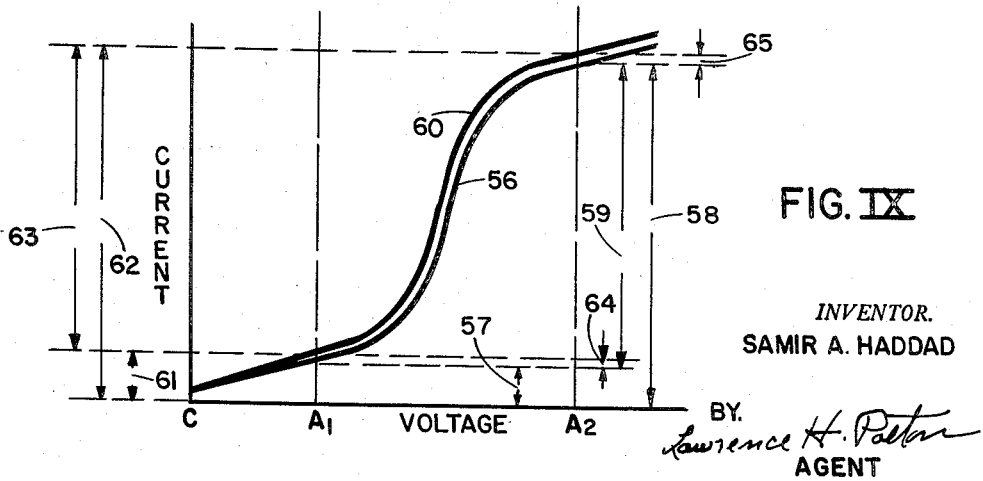
FIG. IX
INVENTOR.
SAMIR A. HADDAD
BY
Lawrence H. Potter
AGENT Sept. 9, 1958 S. A. HADDAD 2,851,654
AMPEROMETRIC DIFFERENTIAL MEASUREMENT SYSTEM
Filed Sept. 25, 1956 4 Sheets—Sheet 4
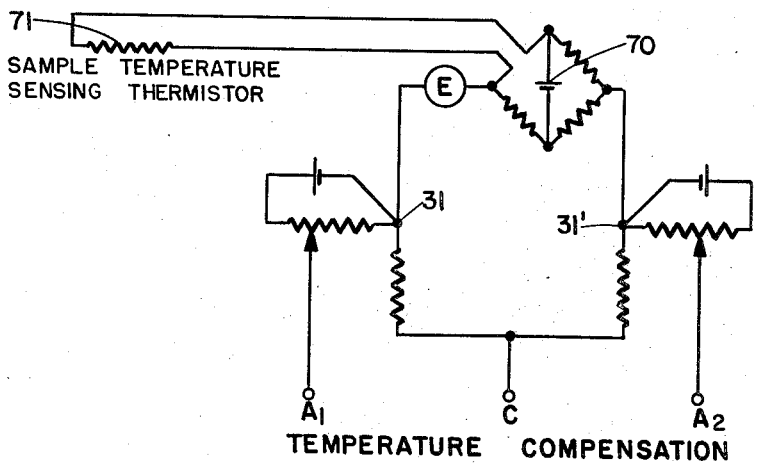
FIG. X
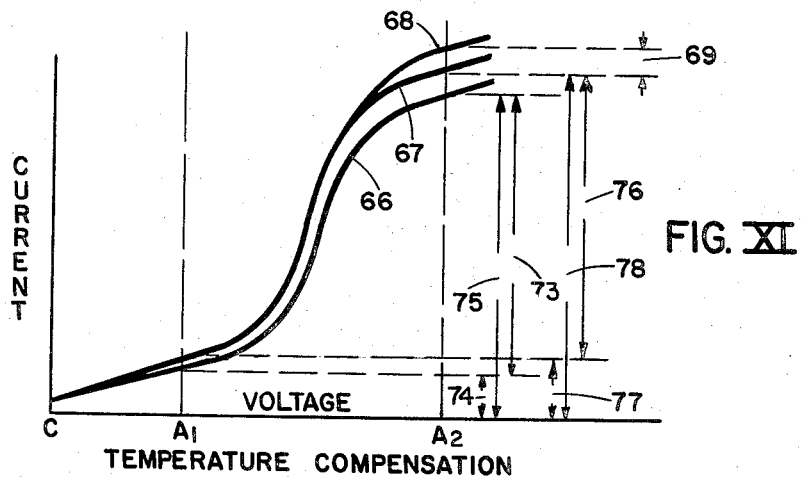
FIG. XI
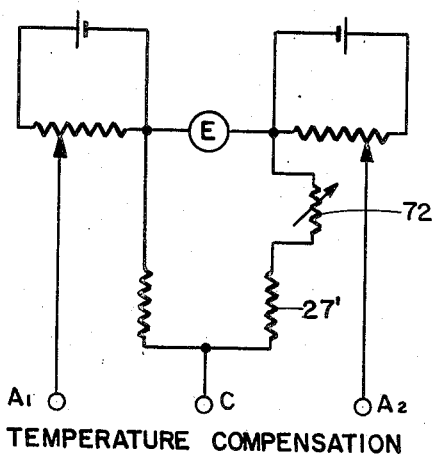
FIG. XII
INVENTOR.
SAMIR A. HADDAD
BY
Lawrence H. Porter
AGENT United States Patent Office 2,851,654
Patented Sept. 9, 1958

2,851,654

AMPEROMETRIC DIFFERENTIAL MEASUREMENT SYSTEM

Samir A. Haddad, Manville, R. I., assignor to The Foxboro Company, Foxboro, Mass., a corporation of Massachusetts Application September 25, 1956, Serial No. 611,924

2 Claims. (Cl. 324—30)

This invention relates to electrochemical measurements wherein electrodes are used in a liquid, and has particular reference to the measurement of electrical current in a circuit which includes a liquid path between such electrodes.

This invention provides a differential, three electrode amperometric system wherein measurement is made under predetermined fixed applied potential conditions.

The purpose of this invention is the measurement of the concentration of a preselected component in a particular liquid in terms of electric current associated with the electrolytic decomposition of said preselected component. As an illustration, hydrazine is useful in boiler feed water to prevent boiler rust and scale if precisely controlled as to concentration, and may be measured with precision as to concentration by this system. Other such measurements may be made of materials capable of electrolytic decomposition, in a liquid body which is at least slightly electrically conductive. Under low electrode potential conditions, the electrical current in the measurement circuit is based on conductivity alone. However, with somewhat greater electrode potential, the decomposition potential of the component being measured is reached and ionic decomposition substantially increases the electrical current. At an electrode potential peculiar to the specific component under test, a maximum diffusion current is reached. The system of this invention takes the differential of the current prior to the decomposition potential with respect to the maximum current, as representative of the component concentration in the liquid under test. The value of a polarization current through the feed water is determined by the thickness of the diffusion layer which is established, the size of the surface areas of the electrodes, and the concentration of the decomposing material such as the hydrazine. The diffusion layer thickness and the electrode areas are established as constant factors, and under suitable fixed potential electrode conditions the electrical current value becomes a manifestation of the hydrazine concentration. Other suitably similar measurements of other preselected components may also be made in like fashion.

This invention particularly provides a means for selectively measuring the concentration of a preselected component to the exclusion of effects produced by other possibly present materials and by the conductivity of the liquid itself. This is accomplished by means of an electrical current differential measurement which encompasses fully and only the current rise due to the electrolytic decomposition of the preselected component material.

Specifically, in this invention, three electrodes are established in a flowing liquid, and two direct current circuits are set up with one of the electrodes as a common, and each of the other electrodes is set up as an indicator electrode individual to one of the direct current circuits. Thus in each of these circuits the liquid between the electrodes is part of the circuit. Further, and with reference to the amperometric characteristics and curves of the preselected component, one of the indicator electrodes is established at a potential which lies in the approach to the decomposition potential of the preselected component, and the other of the indicator electrodes is established at a potential which lies in the polarization current plateau of the preselected component. The differential measurement is taken between the direct current circuits.

The structural features of a specific form of this invention particularly include three metallic electrodes of materials selected as having liquid-solution equilibrium characteristics similar with respect to each other, over a preselected range of concentration variation of the preselected component of the liquid under measurement. Platinum is an example. Possible potentiometric changes, such as pH variations, in the liquid under measurement are thus automatically effectively nullified, since the electrical potentials of all of the electrodes are similarly varied by such changes, and the electrodes, throughout this automatic adjustment, are essentially maintained in their relative electrical potential relationship with each other.

Prior art devices such as calomel electrodes are usually unsuitable for this invention especially when used as reference electrodes inasmuch as the characteristics of the calomel electrode are such as to maintain effectively constant electrical potential with respect to the solution, in which case no compensation for potentiometric changes of the solution occurs. Furthermore such prior art electrodes are undesirably subject to breakage and refilling problems.

Prior art devices are subject in many instances to measurement error due to the possible presence of other materials capable of electrolytic decomposition, and to the electrical current due to the conductivity of the liquid under measurement.

This invention provides a differential amperometric measurement system.

This invention further contemplates measurement compensation with respect to temperature variations in the liquid sample.

This invention further contemplates continuous measurement of a flowing liquid.

Accordingly, it is an object of this invention to provide a new and improved amperometric measurement system.

Another object is to provide a new and improved measurement system for determining the concentration of hydrazine in boiler feed water.

Other objects and advantages of this invention will be in part apparent and in part pointed out hereinafter and in the accompanying drawings, wherein:

Figure I is a schematic showing of an illustrative embodiment of this invention in the form of a boiler feed water system with hydrazine additive and concentration measurement;

Figure Ia is a fragmentary representation of the electrodes of Figure I, showing the uniform distribution of the electrode apertures;

Figure II is a simplification of the electrical circuit showing of Figure I, illustrating the three electrode differential measurement according to this invention;

Figure III is a central longitudinal section of a measuring head suitable for the system of Figure I;

Figure IV is a cross-section of the whole of the measuring head of Figure III, taken on a line as indicated at IV—IV in Figure III;

Figure V is an elevation of the whole of the measuring head of Figure III;

Figure VI is a face view of a perforated plate electrode as used in the measuring head of Figures I, III, IV, and V;

Figure VII is an electrical current curve with respect to electrode voltage in relation to a liquid under test with a material such as hydrazine in the liquid;

Figure VIII is a curve of the nature of that of Figure

VII, wherein the liquid contains several different materials, each capable of electrolytic decomposition with practical ranges of potential;

Figure IX is a curve like that of Figure VII, illustrating the effect of a conductivity change only, in the liquid;

Figure X is a circuit like that of Figure II and embodying one form of measurement compensation with respect to temperature variation in the liquid under test;

Figure XI is a curve like that of Figure VII, illustrating the temperature compensating operation of the circuit of Figure X, and involving a diffusion coefficient change in addition to the conductivity change as illustrated in Figure IX; and Figure XII is a circuit like that of Figure II and embodying another form of temperature compensation.

In the Figure I illustrative embodiment application of this invention, the feed water system comprises a supply pipe 10 leading into a feed water storage tank 11. The output of the storage tank 11 is directed through suitable conventional means as indicated by dotted line 12 to a boiler 13 as the feed water supply therefor. The steam output of the boiler is indicated by dotted line 14 and is applied to whatever suitable use is desired, as is indicated in the drawing by the block 16 entitled "Process." In this illustrative application the additive used is hydrazine. This is a liquid which is added to the boiler feed water as an oxygen scavenger as a means of avoiding scale or rust in the boiler. The hydrazine concentration in the boiler feed water needs to be accurately applied and closely controlled, since too little hydrazine would leave undesirable oxygen in the boiler, and too much would tend to form other undesirable compositions in the boiler. The manner of supplying the hydrazine to the boiler feed water is not critical. One form of such application is shown in Figure I wherein a supply tank 16 is charged with hydrazine which is allowed to flow by gravity, through a pipe 17 into the feed water supply pipe 10 prior to the entrance thereof into the feed water storage tank 11. The rate of hydrazine supply flow may be regulated by adjusting a hand valve 18 in the hydrazine supply pipe 17.

Measurement of the hydrazine concentration in this particular instance is taken with respect to a continuously flowing sample of the boiler feed water after it leaves the feed water storage tank 11 as indicated by dotted line 19. The sample flow is directed through a measurement conduit 20 and is thereafter direct to waste, although it may be fed back into the feed water storage tank 11 by suitable means (not shown) is desired. Within the measurement conduit 20 there are located three measurement electrodes $A_1$, C, $A_2$. An edge view of these electrodes is shown in Figure III and face views are shown in Figures IV and VI. As a specific illustration the electrodes of Figure I are shown as flat perforated screen-like discs mounted transversely of the measurement conduit 20 and are spaced therealong with respect to each other so that the sample liquid flowing through the conduit 20 may form electrical paths between the electrodes as parts of circuits including the electrodes. Various electrodes may be used with varying degrees of efficiency and as a specific example the electrodes may be platinum, and as shown in the drawings, all of the same size and shape, such as to substantially fill the measurement conduit. The electrodes are provided with evenly distributed perforations 24 through which the boiler feed water sample flows and which thus provide a thin, uniform diffusion layer on the indicator electrodes, for quick response. A form of screen or grid electrode may be used to advantage in this manner.

The electrodes $A_1$, $A_2$, C are used electrolytically and as amperometric measurement devices. A circuit arrangement 25 is associated with the electrodes for this purpose. This circuit is also shown in somewhat simpler form in Figure II. The circuit 25 is a differential arrangement of two individual circuits 25' and 25". The electrode C is common to both circuits 25' and 25", the electrode $A_1$ is in circuit 25' and the electrode $A_2$ is in circuit 25". The circuit 25' is energized by a battery 26 through a series resistor 27 to the common electrode C. This circuit then continues through the boiler feed water sample as indicated by dotted line 28 to the electrode $A_1$ and then by way of a variable resistor 29 and a lead 30, back to the battery 26. The circuit 25" is identical with that as shown at 25' and as indicated at 26', 27', 28', 29', and 30'. In each of the individual circuits the variable resistors 29 and 29' are further connected to a point between their respective batteries 26 and 26' and their respective series resistors 27 and 27'. The circuit junctures thus formed as at 31 and 31' are used as the terminals from which a voltage measurement is taken to get a current differential as between the two circuits with this device indicated at E in Figure II and in Figure I shown as a recording instrument 32. To accomplish the differential measurement of this device in a manner set forth hereinafter the electrodes $A_1$, C, and $A_2$ are provided with different potentials. The common electrode C is essentially connected directly to both the individual circuits 25' and 25" and it thus has a potential common to both of the individual circuits. The potential at the electrode $A_1$ is supplied from the battery 26 and is selected by variations of the variable resistor 29. Similarly, the potential at electrode $A_2$ is supplied from battery 26' according to the adjustment variation of the variable resistor 29'. For a particular conductance range, for example, the electrode C potential may be essentially zero, $A_1$ one tenth of a volt, and $A_2$ one half of a volt.

The measurement action of this device may be discussed in connection with Figures II and VII. In such an amperometric measurement the flowing liquid must in itself be somewhat conductive. Because of this, in a circuit arrangement such as 25', Figure II, there is a conduction current in the form of a minor ionic migration between electrodes of different potentials such as electrodes C and $A_1$. This conduction current increases with potential as indicated in the Figure VII curve for example, in the approach portion 33 thereof and again in the limiting current plateau 34. In the case of any such component as hydrazine there is a decomposition potential at which the hydrazine starts to break down and from this point to the beginning of the limiting current plateau 34 there is a substantial rise in the current through the flowing liquid as a result of a substantial increase in ionic decomposition as indicated by the S type curve 35 in Figure VII. The amplitude of the curve 35 is representative of the concentration of the component such as hydrazine in the feed water sample. In the analysis of a multi-component solution, as indicated in Figure VIII, for the most part the different components are represented by different curve portions at different potential levels. In any event the amplitude of each polarization curve is representative of the concentration of the particular component which is being measured. Thus, and with particular reference to Figure VII, by establishing the electrode C at essentially zero potential, the electrode $A_1$ at a potential which lies in the approach to the polarization curve and adjacent to the actual starting point thereof, and the electrode $A_2$ at a potential which is in the limiting plateau, we essentially bracket the polarization current curve 35 and measure its amplitude by the differential arrangement of the circuit of Figure II. This circuit essentially makes two instantaneous current amplitude measurements. One, 33', is between the electrode $A_1$ and the common electrode C and represents, with reference to Figure VII, the current of conduction only, prior to the decomposition break-down of the hydrazine component. The other measurement 35' is between the common electrode C essentially at zero potential and the limiting current plateau potential at electrode $A_2$. These two measurements having been made simultaneously and the differential $d$ thereof taken, this differential cancels out the measurement of the current of conduction and produces as a resulting measurement the actual amplitude of the specific polarization curve 35, that is to say, the polarization current of the hydrazine component in representation of the concentration of the hydrazine in the flowing sample of boiler feed water.

Figures III, IV, and V illustrate one form of a measurement sensing unit which may be used to contain the electrodes C, $A_1$, and $A_2$, as indicated in Figures I and II. The Figure III structure comprises a housing sleeve 36 with end closure caps 37 and 38. This unit has the electrodes $A_1$, C, and $A_2$ arranged therein as generally indicated schematically in Figure I. A passage through the Figure III unit is provided by opening 37' and 38' in the end cap units and by a conduit sleeve assembly 39 extending transversely through the measurement unit. The conduit assembly 39 comprises end sleeves 39' which have end portions located in the end cap openings 37' and 38' and sealed therein by O-rings 40. Spacing members 41 and 42 are provided between the end sleeves 39' and between the spacing members there are located mounting washers 43, 44, and 45 which hold the electrodes $A_1$, C, and $A_2$ therebetween respectively. In an endwise fashion this whole arrangement thus forms the complete conduit assembly 39. This assembly is held together endwise by a pair of disc plates 46 and 47 mounted over the outer end of the conduit assembly 39 and abutting on endwise facing shoulders 48 and 49 on the conduit sleeves 39'. The assembly plates 46 and 47 are joined by three bolt arrangements 50 as shown in Figure III with their locations indicated in Figure IV. The central assembly of this conduit arrangement is held together radially by a sleeve 51 which has a lengthwise slot 52 therein to admit electrode connection pins 53 as well as the supporting arms of the electrodes $A_1$, C, and $A_2$ as indicated in Figure VI at 54. Suitable electrical leads are provided to the connection pins 53 so that the electrodes have electrical lead connections $A_1'$ C', and $A_2'$ as indicated at the bottom of Figure III. These electrical leads are applied to the measurement unit through a lateral connection assembly 54 suitably electrically insulated and suitably sealed against dirt and moisture. The conduit sleeve arrangement 39 is formed of electrically non-conductive material so as to properly electrically separate the electrodes $A_1$, C, and $A_2$ except for the electrical current through the feed water sample which flows through the electrodes. The differential measurement is essentially instantaneous so that the fact that the sample liquid is flowing, even though it may be at a substantial rate, does not affect the measurement by presenting new bodies of liquid to the measuring arrangement. A key and slot arrangement 55 is provided lengthwise of the measurement unit to hold the conduit assembly 39 and the electrodes therein against rotation within the device.

Referring to Figure VIII, reference is again made to the form and character of the measurement possible with the device of this invention. Figure VIII specifically indicates a measurement of a particular component of a boiler feed water sample under the circumstance wherein the boiler feed water sample also contains components other than hydrazine, in the case where such other components are electrolytically decomposable. In the Figure VIII showing, for example, there are components X, Y, and Z, with the component Y representing the hydrazine which is to be measured as to concentration. By considering Figures VIII and II together it will be noted that in the Figure VIII arrangement the common electrode C is again provided with essentially zero potential, the electrode $A_1$ is provided with a potential in the approach to the polarization curve of the hydrazine component and the electrode $A_2$ is provided with a potential in the limiting current plateau of the hydrazine component, thereby bracketing the polarization curve Y and thereby, with this differential measurement, measuring the amplitude of the polarization curve Y in representation of the concentration of the hydrazine component of the boiler feed water sample. Thus it may be seen in this instance that by using the three electrode differential system of this invention, the effect in the boiler feed water of electrolytically decomposable components whose measurement is not wanted may be kept out of the actual measurement so that the hydrazine alone or whatever component is selected for measurement, may be measured. As was discussed in connection with Figure VII the simple current of conduction in the feed water sample is cancelled out, and in this differential measurement, current provided by the decomposition of component X and that of the component Z is cancelled out also. This is accomplished by again taking the differential $d'$ of two essentially instantaneous measurements, one at X' as between electrode C at essentially zero potential and electrode $A_1$ as at a potential in the approach to the polarization curve Y which is also in the limiting current plateau of the curve X, and the other measurement at X, Y as between the common electrode C as at essentially zero potential and the electrode $A_2$ as at a potential which is in the limiting current plateau of the hydrazine curve Y, this also being in the approach to the polarization curve of the component Z. The voltages at which these various electrodes are established is a matter of preselection. In such a multiple component composition as indicated in Figure VIII, as a practical matter there must be some basis of selection with respect to the various components which are susceptible to measurement so that their polarization curves are separable in the manner indicated in Figure VIII.

The Figure IX curve arrangement indicates what happens to the curve of Figure VII when, as in Figure IX, there is a change in the conductivity of the liquid under measurement wherein the magnitude of the polarization current of the hydrazine is not affected, for example, a change in supporting electrolyte concentration may bring about this condition, or it might be caused by some other change other than temperature. It may be seen from the Figure IX curve arrangement that the polarization curve is moved bodily upward with respect to current amplitude when such a conductivity change takes place as an increase. The differential measurement as indicated for curve 56 and taken as between measurement 57 and measurement 58 to result in differential measurement 59, may be seen to be the same as the differential measurement for curve 60 which is the result of measurement 61 and 62 providing the resultant differential 63 which by actual measurement turns out to be the same as differential measurement 59 of the previously mentioned curve 56. Thus the difference in current at $A_1$ is represented at 64 and the difference in the current at $A_2$ is represented at 65, and these measurements 64 and 65 are essentially equal. Accordingly, a conductivity change alone is automatically compensated for by the differential three electrode system of this invention.

When the polarization curve, such as that in Figure VII, is calculated with respect to its particular component such as hydrazine, it is done with respect to the liquid under measurement at a predetermined temperature. When the liquid changes temperature the conductivity changes as indicated in Figure IX, and in addition to this the polarization current of a particular component concentration value also changes. Accordingly, as in Figures X, XI, and XII it is desirable in some instances to provide compensation of the differential measurement with respect to temperature changes. Figure XI indicates automatic compensation with respect to conductivity by reference to curves 66 and 67. Thus far in Figure XI temperature change is automatically compensated for with respect to conductivity in the same manner as that illustrated in and discussed with respect to Figure IX. However, the polarization current change due to said temperature change must also be compensated for. Since there is no polarization current prior to the voltage at electrode $A_1$ there is no need for compensation at that point. The amplitude of the polarization current curve however, is greater in the event of temperature increase, and this is indicated by an extension 68 of the curve 67. It is this amplitude extension as indicated by measurement 69 which must be compensated for, in addition to the automatic compensation as established by curve 67. Such additional compensation may be accomplished for example in the manner indicated in Figure X. The Figure X circuit is identical with that of Figure II except with respect to the actual differential measurement as between the measurement take-off points 31 and 31'. A Wheatstone bridge circuit unit is placed essentially in series between the measurement unit E and the electrode $A_2$ side of the differential measurement circuit, that is, take-off point 31'. One pair of diametrically opposed take-off points of the Wheatstone bridge unit are connected in series arrangement with the measurement device E, and the other pair of diametrically opposed termials of the Wheatstone bridge circuit are used as an independent power supply input for the bridge, from a separate power source such as battery 70. One leg of the Wheatstone bridge is extended and provided with a temperature sensitive resistance element 71 to be placed in the liquid under measure. This circuitry is arranged as to component and component values so that upon temperature increase the output of the bridge will oppose the measurement E sufficiently to compensate for the measurement 69 of Figure XI. Because, as indicated in Figure XI, compensation is needed only on the $A_2$ electrode side and with respect to the polarization curve, since it is a polarization current amplitude change that results from temperature change, the compensation in the circuit of Figure X is applied to the $A_2$ side of the differential circuit only, and none is needed on the other, $A_1$, side of the differential circuit.

The temperature compensation, three electrode differential circuit of Figure XII is also like the circuit of Figure II in all respects except it is provided with a temperature compensation arrangement in the form of a variable resistor 72 which is mounted in series with the usual series resistor 27' in the $A_2$ side of the differential circuit. Here again, the temperature compensation resistor is on this side of the circuit only because there is no polarization current change in the other side of the circuit. That is, at the $A_1$ potential, there is no polarization current and therefore no temperature effect. Any suitable device which is temperature sensitive may be used to vary the variable resistor 72 in the proper direction according to the type of sensing element used, to alter the measurement at E and achieve the compensation indicated in Figure XI at measurement 69. Accordingly, an increase in temperature could be made to decrease the resistance in variable resistor 72 thus decreasing the voltage drop across resistors 27' and 72 together, and producing the effect of reducing the differential measurement E in a temperature compensation action which effectively cancels out the temperature caused polarization current amplitude increase as indicated at 69 in Figure XI. In this manner a true representation of the hydrazine concentration is achieved just as if there had been only a conductivity change as in Figure IX or as if there had been no change as in Figure VII. Figure XI indicates by a differential measurement 73 the comparison of measurement $A_1$—C at 74 with measurement $A_2$—C at 75. This is the initial differential measurement prior to temperature change. Another differential measurement 76 is indicated as the comparison of measurement $A_1$—C at 77 and measurement $A_2$—C at 78, these being the measurements taken after the temperature change. Note that differential 76 and differential 73 are essentially equal in the same fashion that the differentials were in Figure IX. The measurement 69 does not appear because it is cancelled out by the temperature compensation arrangement such as indicated in Figures X and XII.

This invention, therefore, provides a new and improved electrochemical measurement device wherein amperometric measurements are made with a three electrode system on a fixed potential basis for a given set of electrochemical conditions as a means of providing a differential measurement representation of the concentration of a preselected component in a liquid under measure.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

1. In a boiler feed water continuous electrical measurement system, in combination, a sensing unit comprising an electrical insulation sleeve form for carrying said feed water, three perforated metal plate electrodes mounted transversely through said sleeve form and in spaced relation therealong, an outer housing sleeve enclosing the central section of said insulation sleeve and said electrodes, end mounting caps assembled over the ends of said insulation sleeve in sealed relation therewith and forming end closures for said housing sleeve, and an electrical access arrangement, with respect to said electrodes, through the side wall of said housing sleeve, a pair of direct current electrical circuits each including a different pair of said electrodes and the feed water therebetween, and differential means for measuring the concentration of a preselected component of said feed water in terms of electrical currents through said circuits, as varied by changes in said concentration.

2. An operatively fixed potential, continuous process, three electrode amperometric differential measurement system wherein a flowing liquid is subjected to electrical measurement to continuously determine the concentration therein of a preselected component of said liquid, said system comprising, in combination, a single electrical circuit arrangement embodying a pair of electrical measuring circuits with said measuring circuits having separate indicator electrode and a common reference electrode and with said electrodes all fixedly established in said liquid and spaced with respect to each other to provide a liquid path in each of said measuring circuits as a part thereof between each of said indicator electrodes and said reference electrode, a sensing unit comprising an electrical installation sleeve form for carrying said flowing liquid, said electrodes being mounted in said sleeve form transversely thereof and each comprising a platinum metal disc with evenly distributed multi-perforations for the passage of the flowing liquid therethrough and the establishment of a uniform, thin, diffusion layer thereon, an outer housing sleeve enclosing the lengthwise central section of said installation sleeve form and said electrodes, end mounting caps assembled over the ends of said installation sleeve form in sealed relation therewith and forming end closures for said housing sleeve, and an electrical access arrangement, with respect to said electrodes, through the side wall of said housing sleeve, means for individually energizing said measuring circuits to provide opposed direct current conditions in said circuit arrangement and for establishing different, operationally fixed, electrical potentials at each of said electrodes, with said reference electrode at effectively zero potential and with said indicator electrode potentials preselected with reference to the amperometric characteristics and curves of said preselected component, in that the potential at one of said indicator electrodes lies in the approach to the decomposition potential of said preselected component, the potential at the other of said indicator electrodes lies in the limiting current plateau of said preselected component, means for measuring the differential provided by said electrical current conditions in said measuring circuits while maintaining said electrode potentials fixed, said differential measurement thus being varied in representation of the concentration variation of said preselected component in said liquid, each of said measuring circuits comprising a pair of resistances in series between said common electrode and the respective indicator electrodes, and said differential measuring means comprising a voltage drop measuring device connected to each of said measuring circuits at a point between said series resistances therein, and temperature compensation means for modifying said differential measurement in compensation for temperature changes in said flowing liquid, said temperature compensation means including a bridge circuit arrangement between said pair of direct current circuits and in series relation with said differential measuring means.

References Cited in the file of this patent

UNITED STATES PATENTS

| | | |
|---|---|---|
| 1,399,200 | Edelman | Dec. 6, 1921 |
| 2,173,233 | Lienweg et al. | Sept. 19, 1939 |
| 2,232,211 | Cary | Feb. 18, 1941 |
| 2,289,687 | Stuart | July 14, 1942 |
| 2,569,100 | Heyrovsky | Sept. 25, 1951 |
| 2,615,839 | Willier | Oct. 28, 1952 |
| 2,773,237 | Offutt et al. | Dec. 4, 1956 |